(12) United States Patent
Yeh et al.

(10) Patent No.: US 10,537,803 B2
(45) Date of Patent: Jan. 21, 2020

(54) INTERACTIVE GAMING SYSTEM

(71) Applicant: Universal City Studios LLC, Universal City, CA (US)

(72) Inventors: Wei Cheng Yeh, Orlando, FL (US); Travis Jon Cossairt, Celebration, FL (US); Neil Andrew Leiba, Ocoee, FL (US); Erica Lynn McCay, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 17 days.

(21) Appl. No.: 15/874,671

(22) Filed: Jan. 18, 2018

(65) Prior Publication Data

US 2019/0217194 A1 Jul. 18, 2019

(51) Int. Cl.
*A63F 13/46* (2014.01)
*A63F 13/21* (2014.01)
*A63F 13/79* (2014.01)

(52) U.S. Cl.
CPC .............. *A63F 13/46* (2014.09); *A63F 13/21* (2014.09); *A63F 13/79* (2014.09)

(58) Field of Classification Search
USPC ......................................................... 463/36
See application file for complete search history.

(56) References Cited

U.S. PATENT DOCUMENTS

| | | | |
|---|---|---|---|
| 5,946,444 A | 8/1999 | Evans et al. | |
| 6,142,368 A | 11/2000 | Mullins et al. | |
| 6,307,952 B1 | 10/2001 | Dietz | |
| 6,346,886 B1 | 2/2002 | De La Huerga | |
| 6,352,205 B1 | 3/2002 | Mullins et al. | |
| 6,474,557 B2 | 11/2002 | Mullins et al. | |
| 6,526,158 B1 | 2/2003 | Goldberg | |

(Continued)

FOREIGN PATENT DOCUMENTS

| | | |
|---|---|---|
| JP | 2003288472 A | 10/2003 |
| JP | 2004126791 A | 4/2004 |

(Continued)

OTHER PUBLICATIONS

U.S. Appl. No. 15/882,761, filed Jan. 29, 2018, Wei Cheng Yeh.

(Continued)

*Primary Examiner* — Pierre E Elisca
(74) *Attorney, Agent, or Firm* — Fletcher Yoder, P.C.

(57) ABSTRACT

Present systems and methods are directed to an interactive gaming system that includes a first game environment that includes user input devices that receive first user inputs indicative of team/individual performance of a first set of players, and a second game environment that includes user input devices that receive second user inputs indicative of team/individual performance of a second set of players. The interactive gaming system includes a controller that receives the first and second user inputs, accesses dynamic user profiles that correspond the first and the second set of players, updates the dynamic user profiles based on the first and second user inputs, selects a third set of players from the first and second set of players to qualify for a third game environment, and instructs the third game environment based on a subset of the dynamic user profiles that correspond to the third set of players.

20 Claims, 5 Drawing Sheets

(56) References Cited

U.S. PATENT DOCUMENTS

| | | |
|---|---|---|
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |

(56) References Cited

U.S. PATENT DOCUMENTS

| | | | |
|---|---|---|---|
| 9,225,372 B2 | 12/2015 | Butler |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 1,001,079 A1 | 7/2018 | Weston et al. |
| 1,002,262 A1 | 7/2018 | Barney et al. |
| 10,238,979 B2 | 3/2019 | Boyle et al. |
| 2006/0205512 A1 | 9/2006 | Watanabe et al. |
| 2007/0087850 A1 | 4/2007 | Henry et al. |
| 2009/0124320 A1 | 5/2009 | DeWaal |
| 2012/0286938 A1 | 11/2012 | Cote et al. |
| 2013/0116032 A1* | 5/2013 | Lutnick ............... G07F 17/3276 463/17 |
| 2013/0324059 A1 | 12/2013 | Lee et al. |
| 2014/0122170 A1 | 5/2014 | Padgett et al. |
| 2014/0162693 A1 | 6/2014 | Wachter et al. |
| 2014/0370958 A1* | 12/2014 | Lutnick ............... G07F 17/3276 463/17 |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0194817 A1 | 7/2015 | Lee et al. |
| 2015/0236551 A1 | 8/2015 | Shearer et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0067600 A1 | 3/2016 | Barney et al. |
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0203663 A1 | 7/2016 | Proctor |
| 2016/0203675 A1* | 7/2016 | Lutnick ............... G07F 17/3232 463/16 |
| 2016/0217496 A1 | 7/2016 | Tuchman et al. |
| 2016/0226610 A1 | 8/2016 | Pinzon Gonzales, Jr. |
| 2016/0307398 A1 | 10/2016 | Walker et al. |
| 2016/0321548 A1 | 11/2016 | Ziskind et al. |
| 2016/0373522 A1 | 12/2016 | Carlos et al. |
| 2017/0091850 A1 | 3/2017 | Alvarez et al. |
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0316652 A1 | 11/2017 | Siebert et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0014385 A1 | 1/2018 | Wein |
| 2018/0078853 A1 | 3/2018 | Barney et al. |
| 2018/0214769 A1 | 8/2018 | Briggs et al. |
| 2018/0318723 A1 | 11/2018 | Weston |
| 2018/0339226 A1 | 11/2018 | Barney et al. |

FOREIGN PATENT DOCUMENTS

| | | | |
|---|---|---|---|
| JP | 2005267179 A | 9/2005 |
| JP | 2010000178 A | 1/2010 |
| JP | 2012244846 A | 12/2012 |
| JP | 2013188019 A | 9/2013 |
| JP | 6152919 B1 | 6/2017 |

OTHER PUBLICATIONS

U.S. Appl. No. 15/882,721, filed Jan. 29, 2018, Wei Cheng Yeh.
U.S. Appl. No. 15/882,788, filed Jan. 29, 2018, Wei Cheng Yeh.
U.S. Appl. No. 15/882,738, filed Jan. 29, 2018, Travis Jon Cossairt.
U.S. Appl. No. 15/972,940, filed May 7, 2018, Unavailable.
U.S. Appl. No. 15/995,633, filed Jun. 1, 2018, Unavailable.
U.S. Appl. No. 16/196,967, filed Nov. 20, 2018, Matthew Usi.

(56) References Cited

OTHER PUBLICATIONS

U.S. Appl. No. 15/826,357, filed Nov. 29, 2017, Wei Yeh.
U.S. Appl. No. 15/833,839, filed Dec. 6, 2017, Travis Jon Cossairt.
U.S. Appl. No. 15/861,502, filed Jan. 3, 2018, Wei Cheng Yeh.
PCT/US2019/012920 International Search Report and Written Opinion dated Apr. 23, 2019.

* cited by examiner

FIG. 5

INTERACTIVE GAMING SYSTEM

FIELD OF THE DISCLOSURE

The present disclosure relates generally to the field of gaming systems. More specifically, embodiments of the present disclosure relate to methods and equipment utilized to manage and generate interactive multi-player gaming systems.

BACKGROUND

Gaming systems may be included in amusement parks to enhance the experience for guests. Amusement parks typically include a variety of attractions (e.g., rides, interactive game environments, restaurants, shops, and shows) that provide park guests with entertainment. Certain attractions, such as interactive game environments, may appeal to park guests because they are competitive in nature. The winner may be an individual or a group of people. However, determining which player is the winner may be based on only performance in one game environment without regard to their performance throughout other game environments or attractions in the amusement park. For example, a player may engage with both an individual-based interactive game environment and a team-based interactive game environment, but it may be complex to track performance in different types of games. In particular, it may be difficult to integrate individual scores with team scores across interactive game environments to determine an overall winner or a team of winners. Accordingly, there is a need to track performance across various interactive game environments, regardless of whether the interactive game environment is team-based or individual-based.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, an interactive gaming system includes a first game environment that includes user input devices that receive first user inputs indicative of team performance and individual performance of each player of a first set of players in the first game environment. The interactive gaming system also includes a second game environment that includes user input devices that receive second user inputs indicative of the team performance and the individual performance of each player of a second set of players in the second game environment. The interactive gaming system also includes a controller that includes a memory device and a processor that receives the first user inputs and the second user inputs and executes instructions stored on the memory device. The instructions cause the processor to access dynamic user profiles, such that each of the dynamic user profiles corresponds to each player of the first set of players and the second set of players. The instructions also cause the processor to update the plurality of dynamic user profiles based on the first user inputs and the second user inputs, select a third set of players from the first set of players and the second set of players to qualify for a third game environment based on the dynamic user profiles, and provide instructions to the third game environment based on a subset of the dynamic user profiles, such that the subset of the dynamic user profiles correspond to the third set of players.

In accordance with another embodiment, an interactive gaming system includes user-associated devices that each interact with the game environment and transmit user signals indicative of an identity of a user providing the user interaction. The interactive gaming system also includes interactive game elements that communicate with the user-associated devices and transmit sensor signals indicative of a characteristic of the user interaction with the game environment and the identity of the user providing the user interaction. Furthermore, the interactive gaming system includes a controller that includes a memory device and a processor that receives the sensor signals and executes instructions stored on the memory device. The instructions cause the processor to access a profile of the user, update the game environment based on the profile and the sensor signals, and compare the profile of the user to other profiles, such that each of the other profiles correspond to other users in the game environment. In addition, the instructions cause the processor to determine a score of the user in the game environment based on the comparing, provide an indication that the user has qualified for entry into a special game environment based on the score, and associate the user profile with a valid entry to the special game environment.

In accordance with yet another embodiment, an interactive gaming system includes user-associated devices associated with a first team, such that the user-associated devices interact with a game environment and transmit signals indicative of a characteristic of user interaction with the game environment and indicative of an identity of a user providing the interaction. The interactive gaming system also includes a controller, that includes a memory device and a processor, such that the processor receives the signals and executes instructions stored on the memory device, such that the instructions cause the processor to access a first team profile of the first team and a second team profile of a second team in the game environment, configure the game environment based on the first team profile and the second team profile, determine a first score for the first team and a second score for the second team based on the signal, update the first team profile and the second team profile based on the corresponding score, and generate a ranking of the first team relative to the second team.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The systems and techniques described herein include an interactive gaming system, including various game environments that enhance the gaming experience for players. The game environments may include immersive games that a user (e.g., player) may engage with, for example, to accumulate points, compete with other players, accomplish role-playing tasks, and the like. The interactive gaming system may be incorporated into amusement parks. Typically, amusement parks include a wide variety of amusement park attractions that provide entertainment to a diverse audience of park guests. For example, an amusement park may include amusement park attractions such as ride systems, live performances, interactive characters, music performances, and the like. While the present systems and techniques are discussed as applied to amusement parks, it should be noted that the present systems and techniques may be applied to gaming conventions, arcades, attractions on cruise ships, and the like.

Furthermore, the overall gaming experience for a player may be enhanced by providing an interactive gaming system that includes a variety of game environments and various experience-enhancing features that facilitate the interaction of the player with the game environment, while allowing for the saving of data for later play and the integration of data (e.g., individual scores and team scores) across various different types of game environments at different instances in time. It may be complex to integrate individual scores with team scores across interactive game environments taking place at different times and locations across an amusement park to determine an overall winner or a team of winners. By using the score from one game environment to determine a qualifier in a different game environment, the overall game experience may feel like an interconnected journey whereby game play provides a narrative across various game environments. The interactive gaming system may include any suitable number of interactive smaller games (hereinafter referred to as a game environment, e.g., "a first game environment" or "a second game environment"). For example, the smaller games may include missions or tasks that are smaller than a larger game, such as fighting a specialized monster or accomplishing a task that requires smaller games to be completed beforehand. Accessing the larger game (e.g., fighting a specific monster) may be determined by the player's performance in the smaller games.

Embodiments of the present disclosure relate to an interactive gaming system that updates and manages a dynamic user profile for each player in the interactive gaming system to track the experiences of the players throughout the amusement park. In particular, each of the dynamic user profiles tracks the score of a corresponding player in the interactive gaming system and integrates the scores across the various game environments of the interactive gaming system at or near real-time. The dynamic user profile of each player may provide individual scores and team scores, among other data, after or during interaction with each game environment by each player. Furthermore, the dynamic user profile may provide an overall team score and individual score, among other data, associated with the players in the overall interactive gaming system.

In addition, the dynamic user profile may facilitate the retrieving and storage of data associated with the gaming system, such as the overall team score, the individual scores, experience points, and the like. The players engaging with the gaming system may interact with the interactive gaming system via one or more user-associated devices. For example, the players may receive user-associated devices (e.g., wearable sensors) that may be worn by the players (e.g., around their wrist) to facilitate the accumulation of experience points, the team score, and the individual score, thereby facilitating updating the dynamic user profile corresponding to the player wearing a corresponding user-associated device. As such, an individual dynamic user profile may be linked to a corresponding user-associated device, such that the sensor signal transmitted by the user-associated device includes identification information for the dynamic user profile.

Figure 1:
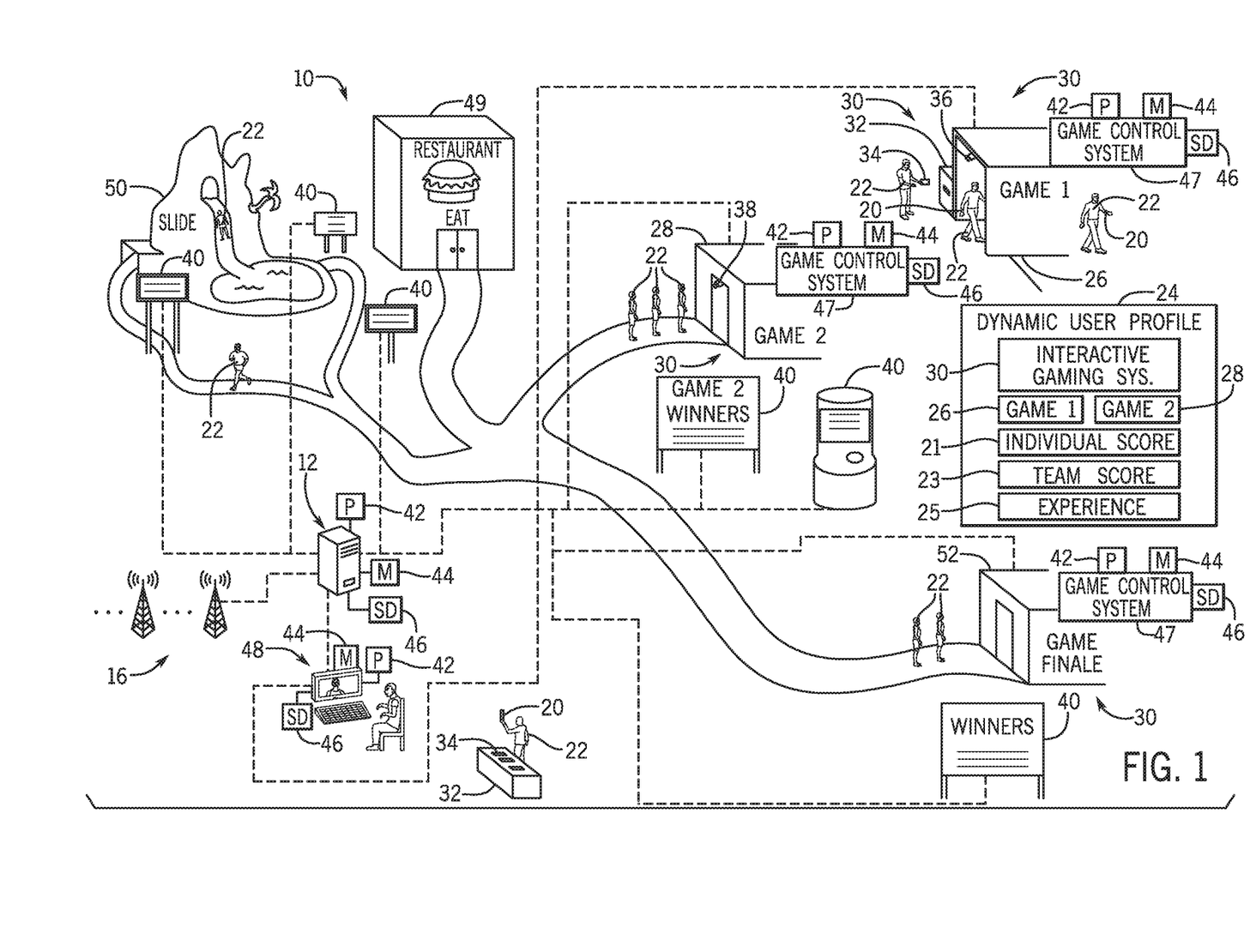
FIG. 1 is a schematic representation of an amusement park including an interactive gaming system, in accordance with an embodiment of the present disclosure.

FIG. 1 is a schematic representation of an amusement park 10, in accordance with present embodiments. In particular, the amusement park 10 includes an interactive gaming system 30. The amusement park 10 includes a control system 12, a wireless communication system 16 (e.g. wireless receivers), user-associated devices 20 (e.g., a wearable sensor bracelet that includes accessible data and communication features) that may facilitate tracking the position of a player 22, and other components that coordinate with one another in accordance with the techniques described herein, as will be described in detail below. In particular, the communication system 16 may facilitate communication between the user-associated devices 20, the game environments, and the control system 12 by facilitating the transfer of data between these features of the amusement park. It should be noted that present embodiments facilitate the integration of data by updating a dynamic user profile 24 across various game environments by continuously updating the dynamic user profile 24 for each player 22 (e.g., at or near real-time), for example, based on player performance in the various game environments.

In an embodiment, the dynamic user profile 24 may include data associated with a first game environment 26 and a second game environment 28 for each player 22. The dynamic user profile 24 may be associated with player (i.e., user) identification information, such as an identity of a park guest. Furthermore, the dynamic user profile 24 may also include data associated with the interactive gaming system 30, which includes the first game environment 26 and second game environment 28. Specifically, the first game environment 26 may include an interactive game environment where various players 22 are split up into teams and interact with haptic sensors by tapping the haptic sensors. Tapping the haptic sensors at a certain time (e.g., in response to them lighting up), causes the player 22 who tapped the sensor to accumulate points stored as individual scores 21, team scores 23, and experience points 25, as an example. In addition, the second game environment 28 may include large screens and small screens that may receive user inputs (e.g., tactile inputs from the hands of the players 22) into a user interface to assemble a puzzle, as an example. The players 22 are assigned individual scores 21, team scores 23, and experience points 25 based on finding puzzle pieces and adequately placing them on the puzzle, as an example. The points and scores may be communicated to the control system 12, which stores the dynamic user profiles 24, so that the dynamic user profiles 24 are updated. The first game environment 26 and the second game environment 28 are discussed in detail with regards to FIGS. 3 and 4, respectively.

In an embodiment, the user-associated device 20 may receive individual scores 21 and team scores 23 for a player accomplishing tasks in the game environments (e.g., tapping haptic sensors, finding puzzle pieces, assembling the puzzle, etc.). For example, the player 22 may receive a higher score relative to another player 22 for tapping more haptic sensors than the other player 22. In addition, the user-associated devices 20 may receive experience points 25, as data, based on the characteristics of the game environment. For example, the player 22 may encounter an animated figure or game character, such as a farm animal, during the first game environment 26, such that the user-associated device 20 may detect that the player 22 faced the farm animal. That is, the farm animal may be associated to the player 22 and as stored information in the dynamic user profile 24 as experience points 25, such that the farm animal may appear in a later game environment based on the experience points 25.

Generally, when players 22 arrive at the amusement park 10, they interact with a ticketing location 32 (e.g., amusement park front desk, kiosk, guest service counter, park gate) where the players 22 (e.g., park guests) may be provided with entry credentials, such as ticketing information (e.g., tickets) 34, user-associated devices 20, a park map, interactive gaming system instructions, and amenities instructions.

In an embodiment, players 22 may enter and be provided entry into the amusement park 10 after receiving their ticketing information 34 and the user-associated devices 20. Specifically, as illustrated in FIG. 1, players 22 may enter through a first entryway 36 to begin interacting with the first game environment 26. Alternatively, the players 22 may enter through a second entryway 38 to begin interacting with the second game environment 28. Certain embodiments of the disclosure include different locations of the first game environment 26 and the second game environment 28. However, the first game environment 26 and the second game environment 28 may be at the same location with an overlap of game space. Furthermore, while certain embodiments of the disclosure are illustrated in conjunction with a user-associated device 20 that may be worn by the player 22 (e.g., around their wrist), it should be understood that the disclosed techniques may be implemented with user-associated devices 20 that are configured to wirelessly communicate guest information (e.g., identification information for the player 22 linked to the dynamic user profile 24, signals indicative of interaction with the game environment) to various control systems around the amusement park, such as pocket-carried devices, handheld devices, user input devices such as joysticks, trigger-based devices, wands, or mobile devices. In an embodiment, the user-associated devices (e.g., the wearable sensors) are waterproof.

In an embodiment, scores and experience points may be ascertained by players by viewing displays 40 provided at numerous locations throughout the amusement park 10. At the entrance to the game environments (e.g., the first game environment 26 and the second game environment 28) of the interactive gaming system 30, displays 40 may display information accessed from the dynamic user profiles 24 for the players 22. The dynamic user profiles 24 provided on the display 40 may be selectively displayed. For example, the displays 40 may include a user interface that players 22 may navigate through to display selective data (e.g., only team scores 23, only individual scores 21 associated with the first game environment 26). Further, at the exit or completion of the first game environment 26 and the second game environment 28, the dynamic user profiles 24 may be displayed based on selections in the user interface of the viewing displays 40. For example, the exit area of the first game environment 26 may include the display 40 that may provide a summary of the players' performance in the first game environment 26 and display the updated dynamic user profiles 24 (e.g., incorporating individual scores 21, team scores 23, and experience points 25 accumulated through participation in the first game environment 26).

In an embodiment, the control system 12 may receive an indication that the player 22 has entered any one of the game environments (e.g., the first game environment 26 and the second game environment 28). This may be achieved by detecting, via passive sensors (e.g., located at entryways 36, 38), the presence of the user-associated devices 20. The passive sensors may communicate the data, via the communication system 16, to the control system 12. Moreover, the control system 12 includes a processor 42, a memory device 44, and a storage device 46. In an embodiment, the control system 12 may be communicatively coupled to each of the game environments and the various features associated with the amusement park 10 (e.g., the user-associated devices 20).

In an embodiment, each of the game environments may include respective game control systems 47 that may be communicatively coupled to the control system 12. The game control systems 47 each include a processor 42, memory device 44, and storage device 46.

In addition, the amusement park 10 may include a base station control system 48 that may facilitate the control of the control system 12 and the various game control systems 47. The base station control system 48 includes a processor 42, memory device 44, and storage device 46. The base station control system 48 may serve as a quality check point, whereby the conditions of the amusement park 10 are monitored. For example, the base station control system 48 may receive data from the control system 12 or the various game environments. An operator of the base station control system 48 may manually control the various game environment and other aspects of the amusement park 10.

Specifically, the processor 42 may be used to execute software, such as software for receiving data indicative of the performance of the various players 22 and updating the dynamic user profiles 24 corresponding to each player 22. Furthermore, the processor 42 may update the dynamic user profiles 24 at or near real-time by integrating individual and team data (e.g., individual score 21, team score 23, and experience points 25) across the various game environments. Moreover, the processor 42 may include multiple microprocessors, one or more "general-purpose" microprocessors, one or more special-purpose microprocessors, and/or one or more application specific integrated circuits (ASICS), or some combination thereof. For example, the processor 42 may include one or more reduced instruction set (RISC) processors.

The memory device 44 may include a volatile memory, such as random access memory (RAM), and/or a nonvolatile memory, such as ROM. The memory device 44 may store a variety of information and may be used for various purposes. For example, the memory device 44 may store processor-executable instructions (e.g., firmware or software) for the processor 44 to execute, such as instructions for updating the dynamic user profiles 24 in response to receiving data indicative of the performance of teams and individuals across various game environments. In an embodiment, the instructions stored in the memory device 44 may cause the processor 42 to update the dynamic user profiles 24 based on the individual score 21, team score 23, and experience points 25 accumulated by participating in the first game environment 26 or second game environment 28.

The storage device(s) 46 (e.g., nonvolatile storage) may include read-only memory (ROM), flash memory, a hard drive, or any other suitable optical, magnetic, or solid-state storage medium, or a combination thereof. The storage device(s) 46 may store data (e.g., dynamic user profiles 24 corresponding to each of various players 22), instructions (e.g., software or firmware for ranking the players 22 based on their individual scores 21, experience points 25, and/or team scores 23), and any other suitable information. In an embodiment, the storage device 46 may store dynamic user profiles 24 for later use. For example, the dynamic user profiles 24 of the players 22 may be stored on the storage device(s) 46 for later use.

In addition, the players, may exit the interactive gaming system 30, for example, to go eat at a restaurant 49, and their dynamic user profile 24 may be stored on the storage device(s) 46 for later use. In addition, the players 22 may interact with other aspects of the amusement park 10 not associated with the interactive gaming system 30, such as the water slide 50, while wearing their user-associated device 20, and their dynamic user profile 24 will be maintained (e.g., will not be erased and reset). As mentioned above, the players 22 may wear their user-associated device 20 for the duration of their stay in the amusement park 10, and while they interact with the water slide 50 (e.g., because the user-associated device 20 may be waterproof) or other attractions in the amusement park 10. Furthermore, the player 22 may altogether exit the amusement park 10, and when the player 22 returns during their next visit, their dynamic user profile 24 may be available because it may be stored on the storage device(s) 46.

Furthermore, the players 22 may accumulate experience points 25, individual scores 21, and team scores 23 in the various game environments (e.g., the first game environment 26 and the second game environment 28). In an embodiment, accumulating an individual score 21, a team score 21, or experience points 25 that are above respective threshold values may permit the players 22 to qualify to participate in the game finale 52 (e.g., a third game environment) of the interactive gaming system 30. Instead of accessing a game finale, in an embodiment, users may access any special game after accumulating a suitable individual score 21, a suitable team score 23, or suitable experience points 25. For example, access to the special game (e.g., the game finale 52) may require that players 22 have a team score 23 and/or individual score 21 greater than other players 22 or above a threshold value. In an embodiment, the players may acquire keys during their participation in the first game environment 26 and the second game environment 28 that may grant the players 22 access to the game finale 52. The keys may be virtual keys stored in the dynamic user profile 24 or real-world objects. In an embodiment, the control system 12 or the user-associated device 20 may receive an indication that the player 22 acquired the key. For example, the user-associated device 20 may include a light device (e.g., a dedicated LED light) that emits light in response to the player 22 acquiring the key.

In an embodiment, the game finale 52 is personalized based on the experience points 25 accumulated by the players 22 throughout their participation in the interactive gaming system 30. That is, the control system 12 may receive data (e.g., experience points) associated with the player 22. The data may be stored and associated with the player 22 for later use (e.g., in the game finale 52). For example, the player 22 may interact with a certain character (e.g., a villain character) in one or more previous game environments, whereby the control system 12 associates the certain character with the player 22 and stores the association on the storage device 46, and displays the character again during the game finale 52. As such, the game finale 52 may be different (e.g., personalized) when players 22 reach the game finale 52, because the players 22 may arrive at the game finale 52 with different dynamic user profiles 24 associated to them (e.g., different individual scores 21, different experience points 25, and different teams scores 23). The game finale 52 may be a team-based game environment, an individual-based game environment, or some combination thereof.

Figure 2:
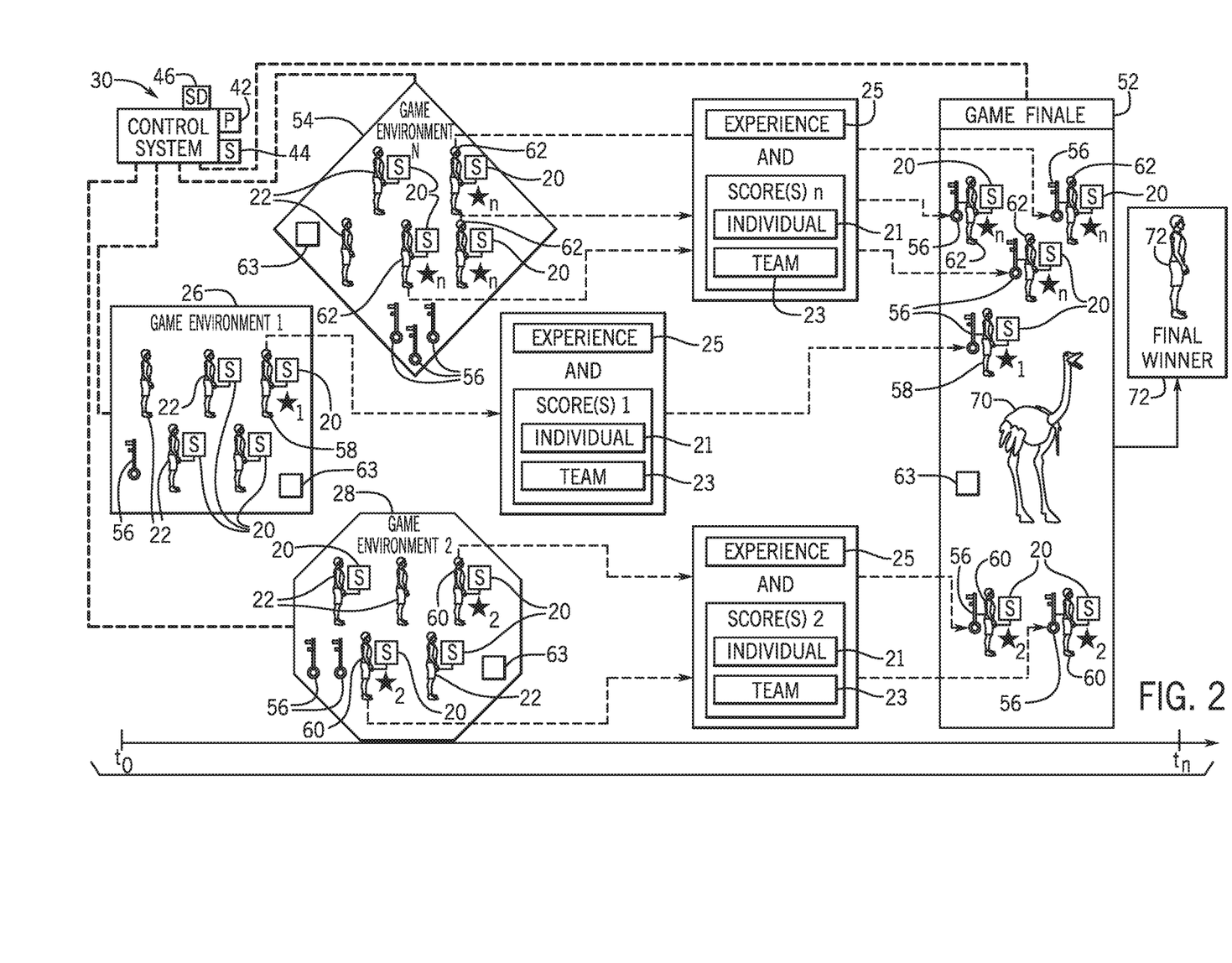
FIG. 2 is a block diagram of an interactive gaming system, including various game environments, included in the amusement park of FIG. 1, in accordance with an embodiment of the present disclosure.

Turning to FIG. 2, depicted is a block diagram of the various game environments of the interactive gaming system 30 of FIG. 1. That is, in the illustrated embodiment, various players 22 associated with the first game environment 26, the second game environment 28, and the nth game environment 54 may compete individually or as teams with opponents (e.g., other players 22) to accumulate individual scores 21, team scores 23, and/or experience points 25. The nth game environment 54 refers to the nth game environment included in the interactive gaming system 30. For example, when the interactive gaming system 30 has seven game environments, the nth game may refer to the third, fourth, fifth, sixth, or seventh game environment. The user-associated devices 20 may facilitate updating of the dynamic user profiles 24, based on player performance in the game environments, by allowing the player 22 wearing the user-associated device 20 to interact with the game environments. The user-associated devices 20 may then transmit data to the control system 12 for processing, whereby the control system 12 accesses and updates the dynamic user profile 24. In an embodiment, the first game environment 26, the second game environment 28, and the nth game environment 54 may be qualifying games for a game finale 52, where a final winner may be determined.

In an embodiment, the interaction of the user-associated devices 20 with interactive game elements 63 of the game environments may generate the signals that are indicative of the interaction. For example, the interactive game elements 63 may sense proximity of each user-associated device 20 or may wirelessly (e.g., via a transceiver) capture identification information from user-associated devices 20 in range of the interactive game element 63. Sensed interactions with the interactive game element 63 that are time-stamped together with a captured identification code or information are associated together to link the interaction to the player 22 and the player's user-associated device 20. For example, the characteristic of the interaction may be that the player 22 has moved to a correct location in the game environment. Other types of interactive game elements 63 may include optical sensors, pressure sensors, cameras, etc. The interactive game elements 63 may pass the interaction information and the associated identification information of the player 22 that performed the interaction to the control system 12 to update the dynamic user profile 24. Accordingly, in certain embodiments, one or both of the interactive game elements 63 or the user-associated device 20 may provide signals indicative of interaction with the game environment.

In an embodiment, the players 22 may interact with the interactive gaming system 30 without the user-associated device 20. As such, the players 22 without the user-associated device 20 may not be associated to a dynamic user profile 24 because the dynamic user profiles are associated to a user-associated device 20 of the player 22. Accordingly, the player 22 without the user-associated device 20 (e.g., which may be worn by the player 22) may not accumulate scores and points used to update a corresponding dynamic user profile 24. However, the players 22 may interact with the various game environments to compete individually or as a team without the user-associated device 20. Indeed, in an embodiment, the game environments may include players with the user-associated device 20 and other players 22 without the user-associated device 20.

In an embodiment, the individual scores 21, the team scores 23, and the experience points 25 may be updated at or near real-time, in response to the players 22 accomplishing game tasks in their respective game environments based on the interaction of the players 22 and the corresponding user-associated devices 20 with the game environments. In particular, the dynamic user profile 24 for each player may be updated continuously based on updates to the individual score 21, team score 23, and experience points 25. The updates to the dynamic user profile 24 may be based on data received by the user-associated device 20 and transmitted to the control systems 12 and/or the game control system 47. In an embodiment, the dynamic user profile 24 may update, starting when the player 22 begins to wear their user-associated device 20 at time to, until the player stops wearing the user-associated device 20 at time tn. For example, the players 22 in the first game environment 26 may augment their individual score 21 by tapping the haptic sensors of the first game environment 26 at suitable times (e.g., when the haptic sensors light up). As such, the individual score 21 may be based on the interaction of the user-associated device 20 with the first game environment 26 (e.g., the interaction with the haptic sensors).

The winner or winners of the game environments may qualify for the game finale 52. In an embodiment, the players 22 who find keys 56 throughout their participation in the various game environments (e.g., the first game environment 26, the second game environment 28, and the nth game environment 54), may qualify for the game finale 52. The key 56 may be an electronic image displayed around the game environments, and when the player 22 taps their user-associated device 20 against the key 56, the key 56 may be stored and associated to the player who tapped on the key 56.

Alternatively or in addition, the winners of the various game environments may be given keys 56 in addition to experience points 25, individual scores 21, and team scores 23 as rewards for winning their game environments (e.g., by accomplishing game tasks, accumulating the highest individual score 21, accumulating the highest team score 23). The winners given keys 56 may be individual winners, a team of winners (e.g., multiple players 22), or some combination thereof. For example, the first game environment 26 may include one winner 58 who may receive one key 56, the second game environment 28 may include two winners 60 who may each receive one key 56, and the nth game environment 54 may include three winners 62 who may each receive one key 56. In the exemplary depicted embodiment, the winners 58, 60, 62 corresponding to each of the game environments are each labeled with a star. Accordingly, in the exemplary depicted embodiment, the game finale 52 may include six total winners (e.g., first winner 58, second winner 60, and third winner 62) who qualify to engage with the game finale 52.

In an embodiment, the players may need to receive a target number of keys 56 (e.g., one key or three keys) before the players 22 are allowed access into the game finale 52. As such, the keys 56 may grant the winners 58, 60, and 62 access to the game final 52. The user-associated devices 20 of each winner may receive the indication that the key(s) 56 was received, such that the user-associated device 20 may update the dynamic user profile 24 to include that the key 56 was received. Indeed, the keys 56 may be associated with the dynamic user profiles 24 of that user-associated device 20.

In an embodiment, the user-associated devices 20 may serve as devices that may grant players 22 access to the various game environments (and the game finale 52). For example, the winners 58, 60, and 62 may scan their user-associated device 20 at the entrance of the game finale 52 to gain access to the game finale 52. Accordingly, in an embodiment, player access to the finale 52 may be granted by the winner scanning their user-associated device 20 at the entrance of the game finale 52, whereby the game control system 47 or the control system 12 may determine that the user-associated device 20 (e.g., and the winner wearing the user-associated device 20) is associated with the key 56 and may gain access to the game finale 52.

As mentioned above, the players 22 may accumulate experience points 25 and scores (e.g., team scores 23 and individual scores 21) through their participation in the various game environments of the interactive gaming system 30. Specifically, the winners 58, 60, and 62 may be associated with respective experiences and scores (e.g., respective experience points 25, respective individual scores 21, and respective team scores 23) that the control system 12 (or the control system 47) may identify and use to customize the game finale 52 according to the respective experiences and scores of the dynamic user profiles. In the depicted embodiment, the winners 58, 60, and 62 and their respective experience points 25, individual scores 21, and team scores 23 are used to personalize the game finale 52. For example, after the winners 58, 60, and 62 present their keys 56 to the entrance of the game finale 52 (e.g., by tapping their user-associated devices 20 against the entrance), the control system 12 may process the experience points and scores associated with the winners 58, 60, and 62 to generate a game finale 52 based on the experience points and scores. That is, the difficulty of the game environment, the objective of the game environment, the type of game environment (e.g., team-based or individual-based), and other game parameters may be based on the experience points and scores of the winners 58, 60, and 62 participating in the game finale 52.

In an embodiment, the game finale 52 may include a game objective of fighting off a final monster character 70 (e.g., a displayed avatar). The winners 58, 60, and 62 may collectively work as a team to fight the final monster 70, while simultaneously augmenting their individual scores 21, which may be used to decide a final winner 72. Alternatively or in addition, the game finale 52 may include any other suitable game objectives. The final winner 72 may be the player 22 who accumulates the most experience points 25, individual scores 21, and/or team scores 23 during the game finale 52. Alternatively, the final winner 72 may be the player 22 who, out of the winners 58, 60, and 62, accumulates the most experience points 25, the highest individual score 21, the highest team score 23. The final winner 72 may be displayed on the displays 40 around the amusement park 10. In an embodiment, the dynamic user profile 24 of the final winner 72 is updated to reflect that the status of a final winner 72 was obtained. In certain embodiments, each team is associated with a game character or theme (e.g. assigned a character). The winning team of the day, e.g., "Red Team" or the character's name may also be displayed. The players 22 may be assigned to a specific character or team, either via player choice or random assignment, and may experience and interact with the environments as a representative of their team during their visit.

Since the game environment associated with the game finale 52 may be personalized based on the dynamic user profiles 24 of the previous winners (e.g., winners 58, 60, 62), in an embodiment, the game finale 52 at a later time may be different than a previous game finale 52. Particularly, two game finales 52 may be different if they include different players 22 with different experience points 25, individual scores 21, and/or team scores 23. As such, the winners 58, 60, or 62 may qualify for the game finale 52 and not have a similar game experience.

Similarly, the various game environments (e.g., the first game environment 26 and the second game environment 28) may be personalized based on the dynamic user profiles 24 of the players 22 interacting with the game environments. For example, the user-associated device 20 may transmit data associated with the dynamic user profiles 24 to the control system 12, whereby the control system 12 processes the data to determine a suitable (e.g., personalized) game environment for the players 22 based on the dynamic user profiles 24.

Figure 3:
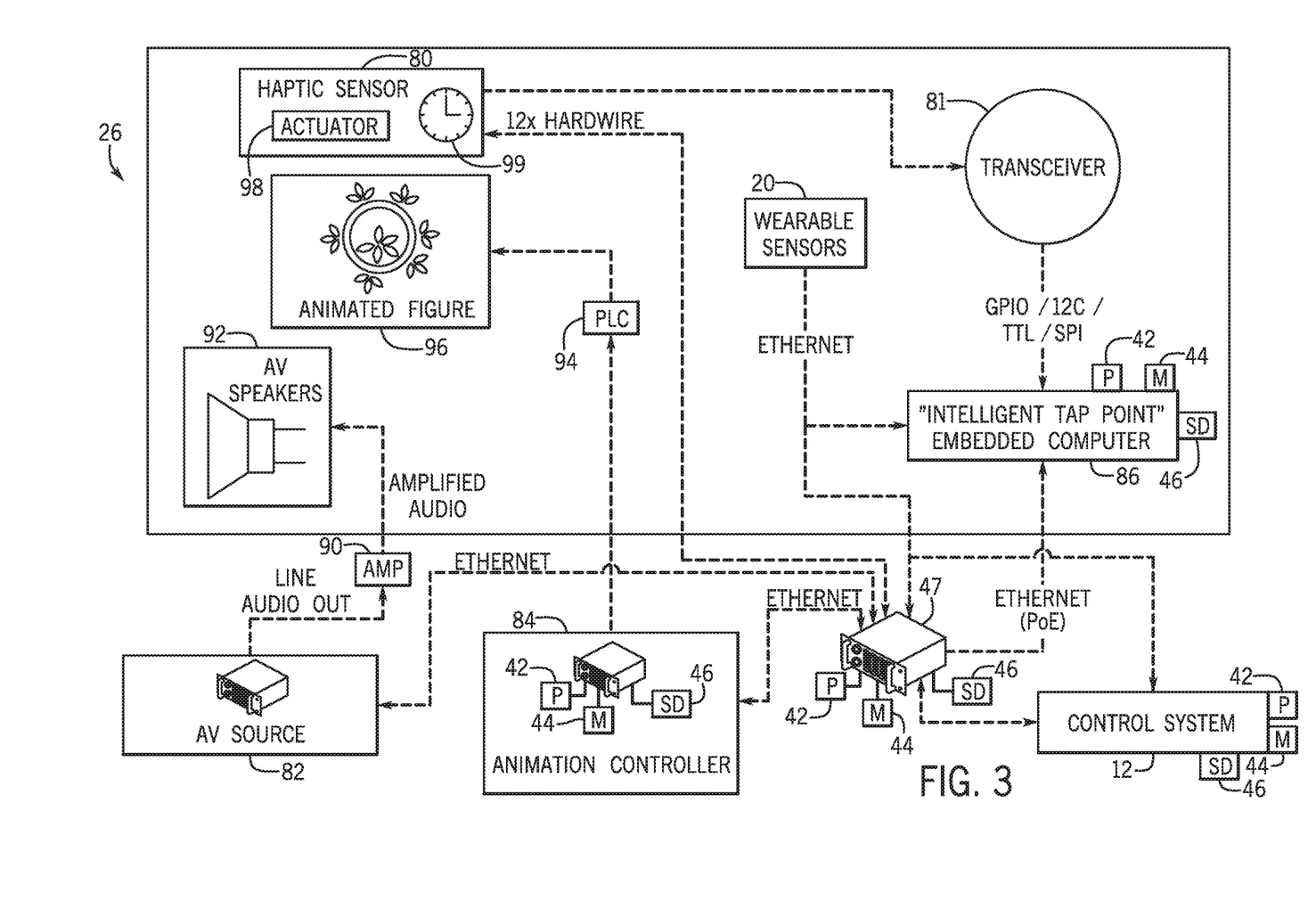
FIG. 3 is a block diagram of a first game environment of the interactive gaming system of FIG. 2, in accordance with an embodiment of the present disclosure.

FIG. 3 is a block diagram of the first game environment 26 of the interactive gaming system 30 of FIG. 2. Specifically, the first game environment 26 may be an interactive game environment where various players 22 are split up into teams and interact with interactive game elements 63, such as haptic sensors 80 that are distributed within the game environment. Specifically, the players 22 may interact with the haptic sensors 80 by tapping the haptic sensors 80. One or more transceivers 81 in the game environment capture identification information of the player 22 that performs the interaction to associate the interaction (tapping) with an individual player 22. However, it should be understood that, in an embodiment, one player 22 may compete against another player 22 by tapping player-worn haptic sensors 80. Tapping the haptic sensors 80 at a certain time (e.g., in response to them lighting up, indicating that the haptic sensors 80 should be tapped), causes the player 22 who tapped the haptic sensor 80 to accumulate points stored as individual scores 21, team scores 23, and experience points 25. Alternatively, or in addition, the haptic sensors 80 may be associated with a certain team, such that when any player 22 accumulates scores and experience points based on the actions of their teammates, the team score 23 may change (e.g., increase). The control system 12 may update the dynamic user profile 24 of the players 22 associated with the haptic sensor 80 that was tapped. Tapping may be a positive or negative score association, depending on the game configuration. For example, certain haptic sensors 80 may be red or forbidden, and inadvertently tapping on them may result in a point penalty.

A transceiver 81 may facilitate communication from the haptic sensor 80 to the control system 12. In an embodiment, the transceiver 81 may couple to the control system 12, the game control system 47, or an "intelligent tap point" embedded computer 86, as described below. Specifically, the transceiver 81 may enable communication via a general-purpose input/output (GPIO) interface that includes an inter-integrated circuit (I2C) protocol. Furthermore, the communication from and to the transceiver 81 may be enhanced by transistor-transistor logic (TTL). In an embodiment, the control system 12, the game control system 47, or the "intelligent tap point" embedded computer 86 may respectively synchronize communication with various subsystems, via a corresponding serial peripheral interface (SPI) bus.

In an embodiment, the control system 12 is communicatively coupled to a game control system 47 of the first game environment 26. The game control system 47 may be communicatively coupled to an audio/visual (AV) source 82, an animation controller 84, the haptic sensors 80, and the "intelligent tap point" embedded computer 86. Specifically, in an embodiment, the game control system 47 is communicatively coupled to the AV source 82, the animation controller 84, and the "intelligent tap point" embedded computer 86 via a wireless (e.g., Ethernet connection) or wired connection. In addition, the game control system 47 may be communicatively coupled to the haptic sensors 80 via a wired connection or a wireless connection. While the illustrated embodiment, includes the game control system 47, it should be noted that in an embodiment, the haptic sensors 80, the AV source 82, the animation controller 84, and the "intelligent tap point" embedded computer 86 may all be communicatively coupled to the control system 12 in addition or instead of being communicatively coupled to the game control system 47.

In addition, the control system 12, the game control system 47, the animation controller 84, and the "intelligent tap point" embedded computer 86 may each include the processor 42, which may execute computer readable code stored in memory devices 44. The control system 12, the game control system 47, the animation controller 84, and the "intelligent tap point" embedded computer 86 may each include corresponding storage devices 46 that may store various data, such as the dynamic user profiles 24.

Furthermore, the AV source 82 may include a multi-channel synchronous video player that may include any suitable number of channels of full high-definition (HD) (e.g., 1080p, 4K). In an embodiment, the AV source 82 may be an AV playback source that synchronizes audio and video players (e.g., the animation controller 84). The game control system 47 may send instructions to the AV source 82 to cause the AV source 82 to send a signal to an audio power amplifier (amp) 90 to cause AV speaker(s) 92 to produce a sound indicative of the signal. For example, the game control system 47 may send instructions to cause the AV source 82 to produce any suitable confirmation sound, such as "CONFIRMATION," in response to the player 22 touching the haptic sensors 80.

The animation controller 84 may receive instructions from the game control system 47 to control the playback of synchronous audio, video, animation, lighting, and mechanical actions. In an embodiment, the animation controller 84 may interface with a programmable logic controller (PLC) 94 to control various animated FIG. 96. For example, the control system 12 may send instructions to cause the PLC 94 to send signals to control certain animated FIG. 96 of the first game environment 26 to enhance the experience. That is, various animated FIG. 96 may be displayed, via the PLC 94, on a wall where the haptic sensors 80 are being touched by the players 22. As such, it may appear as if the players 22 are touching animated FIG. 96 that appear on the wall at the same location the haptic sensors 80 are activated to receive user inputs (e.g., taps). In an embodiment, the animated FIG. 96 may be a 3-dimensional (3D) animated figure that may, for example, emerge from the floor or the wall of the first game environment 26 in response to a signal from the game control system 47. As discussed, the interactions may be associated to an individual player 22 by capturing identification information from user-associated devices 20.

The haptic sensors 80 may be positioned on a wall or on various 3 dimensional (3D) animated figures in the first game environment 26. The haptic sensors 80 may receive tactile user inputs, such as light taps, palm touches, contact from the user-associated device 20, and various tactile inputs to provide the player 22 an updated individual score 21, team score 23, and experience points 25 associated with the dynamic user profile 24 of the player 22. For example, the haptic sensors 80 may be mounted on the animated FIG. 96 and be exposed in response to an actuator 98 causing movement (e.g., opening a door and exposing the haptic sensor 80) based on a control scheme or a time tracker 99 (e.g., periodic clock). After being exposed, the haptic sensor 80 may be touched by the players 22, such that the haptic sensors 80 receive user inputs.

In an embodiment, the first game environment 26 may have a certain time duration (e.g., of 5 minutes), which is tracked by a time tracker 99. Furthermore, the time tracker 99 may enable the haptic sensors 80 to light up or be exposed at a periodic or random basis. The players 22 may be allowed to tap as many haptic sensors 80 as they are able to (e.g., when the haptic sensors 80 light up) during the duration of time to accumulate the most points for their respective individual score 21, team score 23, and experience points. Accordingly, the player 22 or team who taps the most haptic sensors 80 may be declared the winner.

Data associated with the user inputs (e.g., taps to the haptic sensors 80) may be sent to the "intelligent tap point" embedded computer 86 via the transceiver 81. In addition, the "intelligent tap point" embedded computer 86 may receive data associated with the user-associated devices 20 to associate the user inputs to the haptic sensors 80 to the user-associated devices 20 to facilitate updating the dynamic user profiles 24. That is, the "intelligent tap point" embedded computer 86 may receive data indicative of the user inputs to the haptic sensors 80 and data associated with the user-associated devices 20 to associate the user input to the suitable user-associated device 20 to update the dynamic user profile 24 (e.g., by updating the experience points 25, the individual score 21, and the team score 23).

In an embodiment, certain haptic sensors 80 may be associated with the key 56, such that by tapping the haptic sensor 80 at a suitable time, the player 22 who tapped the haptic sensor 80 may gain the key 56. Alternatively or in addition, the player 22 or team who gets the most points (e.g., by tapping the most haptic sensors 80) receives the key 56. The game control system 47 may associate the key 56 to the corresponding player 22.

Figure 4:
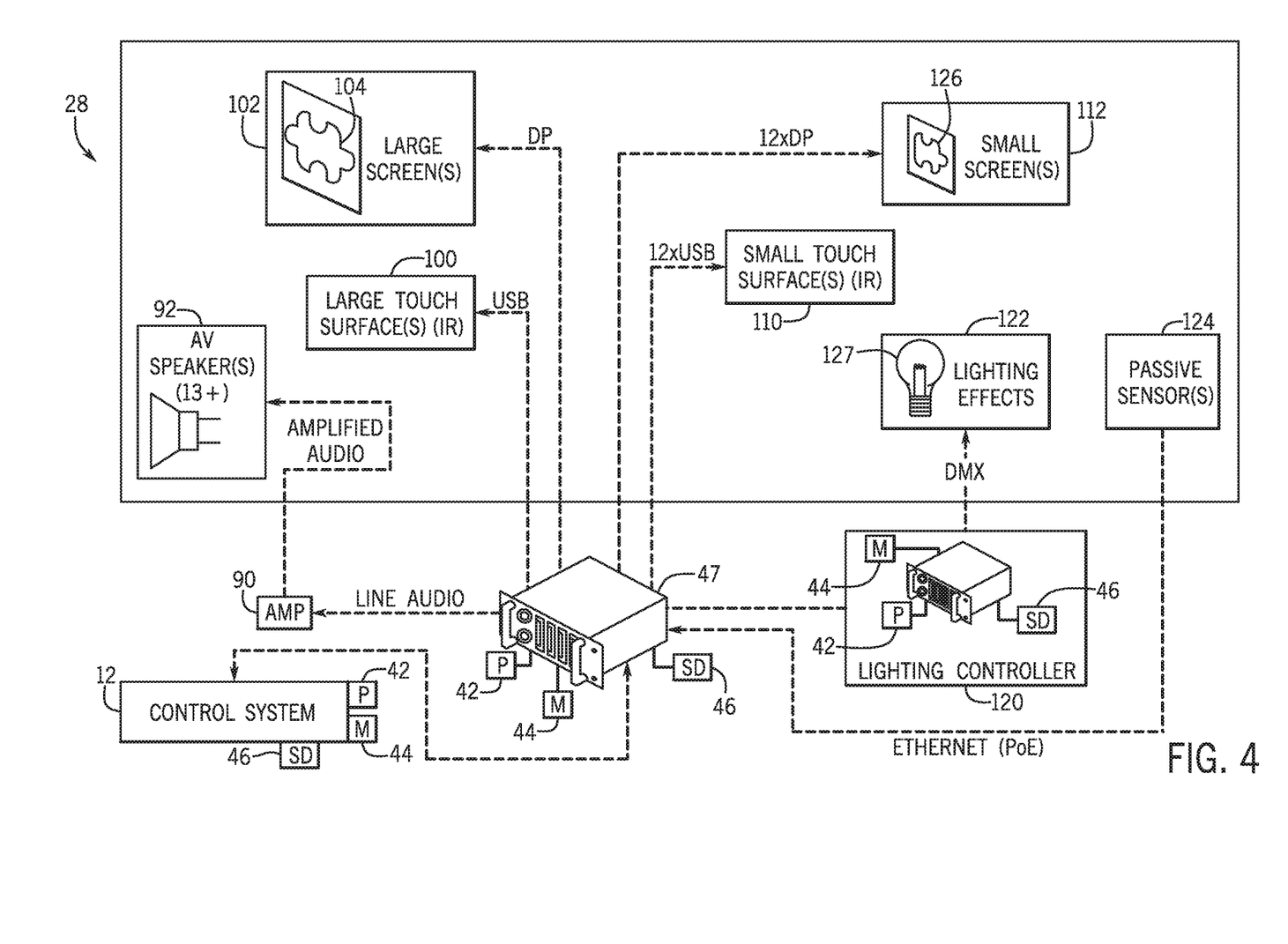
FIG. 4 is a block diagram of a second game environment of the interactive gaming system of FIG. 2, in accordance with an embodiment of the present disclosure.

Turning to FIG. 4, depicted is a block diagram of the second game environment 28 of the interactive gaming system 30 of FIG. 2. The second game environment 28 may be an interactive game environment where various players 22 are split up into teams and interact with large touch surfaces 100 on a large screen 102 and small touch surfaces 110 on small screens 112 to, for example, assemble a puzzle 104. However, it should be understood that the second game environment may include one player 22 competing against another player 22 to assemble the puzzle 104. The atmosphere of the second game environment 28 may be enhanced via a lighting controller 120 that controls lighting effects 122 inside the second game environment 28.

Specifically, when the players 22 enter into the second game environment 28, a passive sensor 124 may detect the presence of the player 22 via their user-associated device 20. The passive sensor 124 may then send an indication to the game control system 47 and/or the control system 12 that the user-associated device 20 has been detected. In an embodiment, the game control system 47 or the control system 12 may associate the dynamic user profile 24 associated with the detected user-associated device 20 to the second game environment, such that the dynamic user profile 24 is updated based on the user inputs to the second game environment 28.

In addition, the game control system 47 or the control system 12 may personalize the second game environment 28 based on the dynamic user profiles 24 of the detected players 22. For example, the control system 47 and/or the control system 12 may personalize the second game environment 28 by determining the difficulty, puzzle-type, and lighting effects 122 based on the individual score 21, the team score 23, and/or the experience points 25 of the detected players 22. Indeed, the second game environment 28 may be more difficult for players 22 with higher individual scores 21 than for other players with lower individual scores. Alternatively or in addition, the second game environment may be more difficult for teams with higher team scores 23 than for other teams with lower team scores 23.

Furthermore, the game control system 47 may send a signal (e.g., with instructions) to the audio power amplifier (amp) 90 to cause AV speaker(s) 92 to produce a sound indicative of the signal. For example, the game control system 47 may send instructions to cause the AV speaker(s) 92 to produce any suitable confirmation sound, such as "CONFIRMATION," in response to the player 22 finding the puzzle piece 126 on the small touch surface 110. In addition, the AV speaker(s) 92 may produce a sound, such as "START," indicating the start of the game environment tasks (e.g., assembling the puzzle 104) associated with the second game environment 28.

After the second game environment 28 starts, various puzzle pieces 126 may be scattered along the perimeter of the walls of the second game environment 28. Specifically, the walls of the second game environment 28 may include various small screens 112, with corresponding small touch surfaces 110 that may each be an infrared (IR) touch surface that includes one of the scattered puzzle pieces 126. The various small screens 112 may be coupled to the game control system 47 or the control system 12 via corresponding display port (DP) connectors. As such, the small screens 112 may receive instructions from the game control system 47 and/or the control system 12 regarding, for example, the placement of the scattered puzzle pieces 126 on the small screens 112. Further, the small touch surfaces 110 may be coupled to the game control system 47 and/or the control system 12 via wired connections (e.g., USB). In an embodiment, touch detection and position tracking may be enabled on the second game environment 28, for example, via the use of LiDAR and radio frequency tracking. Additionally, or alternatively, a room tracking system may be interconnected via Ethernet methodologies and used to facilitate position tracking and/or touch detection.

After the puzzle pieces 126 are scattered along the perimeter of the walls of the second game environment (e.g., on the small screens 112), the players 22 of the various teams may tap the small touch surface 110 corresponding to the puzzle pieces 126. In an embodiment, the puzzle pieces 126 corresponding to the various teams may be color coded (e.g., the puzzle pieces 126 corresponding to the first team may be green and the puzzle pieces 126 corresponding to the second team may be red).

Additionally, the number of puzzle pieces 126 corresponding to each team may vary, based on the dynamic user profiles 24 of the players 22 associated with the team. For example, an easier second game environment 28 may include fifty puzzle pieces 126, while a more difficult game environment may include one hundred puzzle pieces 126.

After the player 22 identifies and touches the puzzle piece 126 (e.g., by tapping the corresponding small touch surface 110), the puzzle piece 126 may propagate (e.g., appear) on the large screen 102 ready to be assembled into the puzzle 104. In an embodiment, there may be one large screen 102 for each team in the second game environment 28. The large screens 102 may be in the center of the perimeter (e.g., walls enclosing or) defining the second game environment 28. Each large screen 102 may include the large touch surface 100. In an embodiment, the large touch surface 100 is an IR touch surface positioned on the center of the second game environment 28, such that the large touch surface 100 may receive tactile user inputs from the players 22. The user inputs may include taps to select puzzle pieces 126, sliding motions to drag puzzle pieces 126 on the large screen 102, and the like. In an embodiment, there is one large screen 102 and/or one large touch surface 100 corresponding to each team. The large touch surface 100 may receive any suitable number of user inputs to facilitate assembling the puzzle 104. For example, the user input from the player 22 may be a tap, a drag, or a flick of the puzzle pieces 126 on the large touch surface 100 to place the puzzle pieces 126 in suitable spots to assemble the puzzle 104.

In an embodiment, the team who assembles the puzzle 104 the fastest may be declared winner. Each of the players 22 on the winning team may each get the key 56. Alternatively or in addition, an individual winner may be determined based on which player 22 found the most puzzle pieces 126 or assembled the most pieces into the puzzle 104, whereby the individual winner of each team gets the key 56. Furthermore, the players 22 may augment their individuals scores 21, their team score 23, and their experience points 25 by tapping puzzle pieces 126 (e.g., on the small touch surfaces 110) or by assembling puzzle pieces 126 (e.g., on the large touch surface 100). In an embodiment, the user-associated device 20 of each player 22 may receive the indication that the player 22 tapped the puzzle pieces 126 (e.g., on the small touch surfaces 110) or assembled the puzzle pieces 126 (e.g., on the large touch surface 100), thereby sending data to the game control system 47 or the control system 12 to update the dynamic user profile 24 of the player 22.

Furthermore, the experience (e.g., environment) of second game system 28 may be enhanced by the lighting controller 120, which controls the lighting effects 122 emitted by various light sources 127 around the second game environment. For example, the light sources 127 may include projector lamps, (e.g., metal halide projector lamps and ultra-high performance (UHP) projector lamps), 2K projectors, 4K projectors, fiber optic tracks, electroluminescent sources, light-emitting diodes (LEDs), RGB (red, green, and blue) lasers, and hybrid light sources (e.g., mercury lamps, fluorescent lamps). The light sources 127 may be communicatively coupled to the lighting controller 120 via a digital multiplex (DMX) communication network. In an embodiment, the lighting controller 120 may control the light sources 127 by producing lighting effects 122, for example, in response to user inputs (e.g., tapping the small screen) or a periodic timer.

Figure 5:
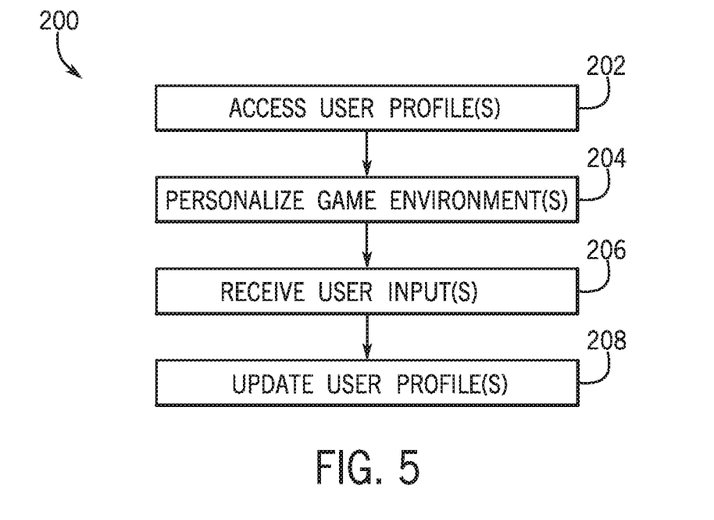
FIG. 5 is a flow diagram of a process of operating an interactive gaming system, in accordance with an embodiment of the present disclosure.

Turning to FIG. 5, depicted is a flow diagram 200 of a process whereby a game environment is personalized and the dynamic user profiles 24 (FIG. 1) are updated, in accordance with an embodiment of the present disclosure. In particular, the control system 12 (FIGS. 1-4) may access the dynamic user profiles 24 (process block 202) after identifying that the player 22 (FIGS. 1-2) is engaging with a certain game environment. The user-associated device 20 (FIGS. 1-4) may send signals to the control system 12, or to one or more sensors or transceivers of the game environment that in turn pass the signals to the control system 12, to facilitate determining that the players are engaging with the certain game environment, thereby triggering access to the dynamic user profiles of particular players 22. The control system 12 then personalizes the game environments (process block 204) based on the dynamic user profiles 24 associated with the players 22 in each game environment. In addition, while the players 22 are engaging with their respective game environments, the control system 12 receives indications of the user inputs (process block 206) into the respective game environments. The control system 12 may then update the user profiles (process block 208) based on the user inputs. In an embodiment, the user-associated device 20 may be communicatively coupled to the game control system 47 (FIGS. 1-4) and/or the control system 12, such that the game control system 47 and/or the control system 12 may perform the process of flow diagram 200.

As discussed above, the control system 12 may access the dynamic user profiles 24 (process block 202) associated with the players 22 wearing the user-associated devices 20. In an embodiment, after the player 22 enters the entryway, passive sensors 124 (FIG. 4) associated with the various game environments may detect the presence of the user-associated devices 20, whereby the dynamic user profile 24 associated with the detected user-associated device 20 is accessed. Indeed, the control system 12 may access the individual score 21 (FIG. 1-2), the team score (FIG. 1-2), and the experience points 25 (FIGS. 1-2) associated with the dynamic user profile 24.

Furthermore, the control system 12 may personalize the game environment (process block 204) based on the individual score 21, the team score 23, and the experience points 25 (e.g., the dynamic user profiles 24). In an embodiment, after the control system 12 accesses the dynamic user profiles 24, the control system 12 may modify (e.g., personalize) various aspects of the game environments based on the dynamic user profiles 24 of the players 22 in the respective game environments. With regard to the first game environment 26, the control system 12 may determine and modify the difficulty level, the time duration, the times that the haptic sensors 80 (FIG. 3) are available to be tapped, the lighting, the position of the keys 56 (FIG. 2), the actions performed by the animated FIG. 96 (FIG. 3), the sound produced by the AV speakers 92 (FIGS. 3-4), and the like. For example, if the experience points 25 of a player 22 indicate that the player 22 previously encountered a farm animal, the control system 12 may modify the first game environment 26 to include the farm animal (e.g., as the animated FIG. 96). Accordingly, the first game environment 26 may be personalized based on the dynamic user profiles 24 of the players 22 in the first game environment 26.

With regard to the second game environment 28, after the control system 12 accesses the dynamic user profiles 24, the control system 12 may modify (e.g., personalize) various aspects of the second game environment 28. The control system 12 may determine the difficulty level of assembling the puzzle 104 (FIG. 4), the time duration of the second game environment 28, the number of puzzle pieces 126 (FIG. 4), the placement of the puzzle pieces 126 on the small screens 112 (FIG. 4), the lighting, the position of the keys 56 (FIGS. 2-4), the sound produced by the AV speakers (FIGS. 3-4), and the like. For example, a team with players 22 with high individual scores 21, high team scores 23, and high experience points 25 (e.g., higher than a threshold value) may be assigned a difficult game environment (e.g., a puzzle 104 with one hundred puzzle pieces 126), whereas a team with new players 22 with lower individual scores 21, a low team score 23, and low experience points 25 may be assigned an easier game environment (e.g., a puzzle 104 with fifty puzzle pieces 126).

While the players 22 engage with the game environments, the control system 12 may receive indications of the user inputs (process block 206). In an embodiment, the control system 12 may receive indications from the user inputs identified by the user-associated devices 20. In addition, the control system 12 may receive the indications of the user inputs without interfacing with the user-associated devices 20. For example, the user-associated device 20 may receive signals indicative of the of the taps to the haptic sensors 80 for the first game environment 26 and indications of the taps to the puzzle pieces 126 on the small screens 112 and the assembling of the puzzle 104 on the large screens 102, and the signals may be transmitted to the control system 12. In addition, the control system 12 may receive an indication that the player 22 retrieved the keys 56.

After receiving the user inputs, the control system 12 may update the dynamic user profiles 24 (process block 208) based on the performance of the players 22 in the game environment. In an embodiment, the control system 12 assigns updates to the individual scores 21, team scores 23, and experience points 25 to the dynamic user profiles 24 associated with the players 22 who engaged with the game environment and were wearing the corresponding user-associated device 20 associated with the dynamic user profiles 24. The control system 12 may update the dynamic user profiles 24 at or near real-time.

In an embodiment, the control system 12 may determine winners 58, 60, and 62 (FIG. 2) of the game environments based on the updates to the dynamic user profiles 24. For example, the control system 12 may determine that the player 22 with the highest individual score 21 is the winner. Alternatively or in addition, the control system 12 may determine the team of players 22 with the highest team score 23 to be the winners 58, 60, and 62. In an embodiment, the control system may determine a final winner 72 (FIG. 2) of the game finale 52 (FIGS. 1-2) based on the player 22 or team with the highest individual score 21 or team score 23 based on the user inputs to the game finale 52.

While only certain features of present embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive gaming system, comprising:
a first game environment comprising a first plurality of user input devices configured to receive first user inputs, wherein the first user inputs are indicative of a team performance and an individual performance of each player of a first set of players in the first game environment;
a second game environment comprising a second plurality of user input devices configured to receive second user inputs, wherein the second user inputs are indicative of a team performance and an individual performance of each player of a second set of players in the second game environment; and
a controller, comprising:
a memory device;
a processor configured to receive the first user inputs and the second user inputs and execute instructions stored on the memory device, wherein the instructions are configured to cause the processor to:
access a plurality of dynamic user profiles, wherein each dynamic user profile of the plurality of dynamic user profiles corresponds to a respective player of the first set of players or the second set of players;
update the plurality of dynamic user profiles based on the received first user inputs and the received second user inputs;
select a third set of players from the first set of players and the second set of players to qualify for a third game environment based on the updated plurality of dynamic user profiles; and
provide instructions to the third game environment based on a subset of the updated plurality of dynamic user profiles, the subset of the updated plurality of dynamic user profiles corresponding to the selected third set of players.

2. The interactive gaming system of claim 1, wherein the first plurality of input devices and the second plurality of input devices comprise haptic sensors configured to detect haptic data.

3. The interactive gaming system of claim 2, wherein the instructions configured to cause the processor to update the plurality of dynamic user profiles comprise instructions configured to cause the processor to assign points to each player of the first set of players and each player of the second set of players based on the detected haptic data.

4. The interactive gaming system of claim 1, wherein the the second set of players comprises a first team and a second team, and wherein the first team is assigned a first team score and the second team is assigned a second team score, wherein the assigned first team score and the assigned second team score are based on the received second user inputs, and wherein the assigned first team score and the assigned second team score are used to determine whether the first team or the second team is selected to qualify for the third game environment.

5. The interactive gaming system of claim 4, wherein the second game environment is a puzzle and wherein the received second user inputs are based on an assembly of the puzzle by the second set of players.

6. The interactive gaming system of claim 1, wherein the instructions are configured to cause the processor to determine a plurality of winners from the first game environment and the second game environment based on the updated plurality of dynamic user profiles, wherein the third set of players comprise the determined plurality of winners.

7. The interactive gaming system of claim 1, wherein the instructions are configured to cause the processor to updated features of the third game environment based on the subset of the updated plurality of dynamic user profiles corresponding to the selected third set of players.

8. The interactive gaming system of claim 1, wherein the instructions are configured to cause the processor to determine a final winner, a final plurality of winners, or any combination thereof, based on the subset of the updated plurality of dynamic user profiles corresponding to the selected third set of players and an outcome of the third game environment.

9. The interactive gaming system of claim 1, wherein the first set of players and the second set of players are non-overlapping.

10. An interactive gaming system, comprising:
   a plurality of user-associated devices, each user-associated device of the plurality user-associated devices configured to interact with a game environment and transmit user signals indicative of an identity of a user providing a user interaction;
   a plurality of interactive game sensors communicatively coupled to the plurality of user-associated devices and configured to transmit sensor signals indicative of a characteristic of the user interaction with the game environment and the identity of the user providing the user interaction; and
   a controller, comprising:
      a memory device storing instructions thereon; and
      a processor communicatively coupled to the memory device, the plurality of interactive game sensors, and the plurality of user-associated devices to receive the transmitted sensor signals, wherein the processor is configured to execute instructions stored on the memory device, wherein the instructions, when executed by the processor, are configured to cause the processor to:
         access a profile of the user;
         update the game environment based on the profile and the received sensor signals;
         compare the profile of the user to other profiles, each profile of the other profiles corresponding to other users in the game environment;
         determine a score of the user in the game environment based on the comparison;
         provide an indication that the user has qualified for entry into a special game environment based on the determined score; and
         associate the user profile with a valid entry to the special game environment.

11. The interactive gaming system of claim 10, wherein each interactive game sensor of the plurality of interactive game sensors is associated with at least one image associated with one or more characters.

12. The interactive gaming system of claim 10, wherein the instructions configured to cause the processor to update the game environment comprise instructions to select or modify the plurality of interactive game sensors.

13. The interactive gaming system of claim 12, wherein the instructions that cause the processor to select or modify the plurality of interactive game sensors are based on the determined score of the user.

14. The interactive gaming system of claim 10, wherein the instructions configured to cause the processor to compare the profile of the user to the other profiles comprise instructions to rank the user relative to the other users, wherein a highest ranked user has a highest score and is determined to be a winner.

15. The interactive gaming system of claim 10, wherein the user signals are indicative of a second characteristic of the user interaction, wherein the second characteristic is a haptic sensor response.

16. An interactive gaming system, comprising:
   a controller communicatively coupled to a plurality of user-associated devices associated with a first team, wherein each user-associated device of the plurality of user-associated devices is configured to interact with a game environment and transmit signals indicative of a characteristic of user interaction with the game environment and indicative of an identity of a user providing the user interaction, wherein the controller comprises:
      a memory device; and
      a processor configured to receive the transmitted signals and execute instructions stored on the memory device, wherein the instructions are configured to cause the processor to:
         access a first team profile of the first team and a second team profile of a second team in the game environment;
         configure the game environment based on the first team profile and the second team profile;
         determine a first score for the first team and a second score for the second team based on the received signals;
         update the first team profile based on the determined first score;
         update the second team profile based on the determined second score; and
         generate a ranking of the first team relative to the second team.

17. The interactive gaming system of claim 16, wherein the instructions are configured to cause the processor to determine an individual score for the user and rank the user relative to the other users in the game environment.

18. The interactive gaming system of claim 16, wherein the first team profile comprises an individual score for each user of a plurality of users of the first team and the team score, wherein the team score comprises an aggregate of the individual score of each user of the plurality of users.

19. The interactive gaming system of claim 16, wherein the first team is associated with a specific theme.

20. The interactive gaming system of claim 16, wherein the instructions are configured to cause the processor to determine whether the first team is a winning team based on the determined first score.

* * * * *